(12) United States Patent
Ikeda

(10) Patent No.: US 11,208,086 B2
(45) Date of Patent: Dec. 28, 2021

(54) HYDRAULIC PRESSURE CONTROLLER, STRADDLE-TYPE VEHICLE BRAKE SYSTEM, AND STRADDLE-TYPE VEHICLE

(71) Applicant: Robert Bosch GmbH, Stuttgart (DE)

(72) Inventor: Shigeki Ikeda, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/626,149

(22) PCT Filed: May 15, 2018

(86) PCT No.: PCT/IB2018/053376
§ 371 (c)(1),
(2) Date: Dec. 23, 2019

(87) PCT Pub. No.: WO2019/002958
PCT Pub. Date: Jan. 3, 2019

(65) Prior Publication Data
US 2020/0148184 A1    May 14, 2020

(30) Foreign Application Priority Data

Jun. 28, 2017   (JP) .............................. JP2017-126487

(51) Int. Cl.
B60T 13/66    (2006.01)
B60T 13/20    (2006.01)
B62K 23/06    (2006.01)

(52) U.S. Cl.
CPC ............ B60T 13/662 (2013.01); B60T 13/20 (2013.01); B62K 23/06 (2013.01)

(58) Field of Classification Search
CPC ...... B60T 13/662; B60T 13/20; B60T 8/3675; B60T 8/3225; B60T 8/42; B62K 23/06
See application file for complete search history.

(56) References Cited

U.S. PATENT DOCUMENTS 8,038,230 B2 * 10/2011 Nakamura .............. B60T 8/368
  303/116.4
8,141,959 B2 * 3/2012 Ota ..................... F15B 13/0835
  303/3

(Continued)

FOREIGN PATENT DOCUMENTS

EP    2085275    8/2009
EP    2216219    8/2010

(Continued)

OTHER PUBLICATIONS

International Search Report for Application No. PCT/IB2018/053376 dated Aug. 10, 2018 (English Translation, 3 pages).

*Primary Examiner* — Thomas E Lazo
(74) *Attorney, Agent, or Firm* — Michael Best & Friedrich LLP

(57) ABSTRACT

A hydraulic pressure controller, cost of which can be cut, a straddle-type vehicle brake system, and a straddle-type vehicle are obtained.
A hydraulic pressure controller (110) is used for the straddle-type vehicle brake system which includes a single system of a hydraulic circuit capable of controlling a hydraulic pressure and in which brake fluid in a wheel cylinder is released to a master cylinder without increasing the hydraulic pressure. A first coil (112B), a second coil (113B), and a hydraulic pressure detector (116) are erected on the same surface of a base body (111). An axis of the hydraulic pressure detector (116) is offset from a reference plane including an axis of the first coil (112B) and an axis of the second coil (113B), and is located between a first plane that is orthogonal to the reference plane and includes the axis of the first coil (112B) and a second plane that is orthogonal to the reference plane and includes the axis of the second coil (113B).

8 Claims, 6 Drawing Sheets

(56) References Cited

U.S. PATENT DOCUMENTS

| | | | | |
|---|---|---|---|---|
| 8,327,517 | B2* | 12/2012 | Ota | ................... B60T 8/4031 |
| | | | | 29/505 |
| 9,511,753 | B2* | 12/2016 | Ota | ................. F15B 13/0835 |
| 2018/0056952 | A1* | 3/2018 | Ono | ................... B60T 8/1706 |
| 2019/0359192 | A1* | 11/2019 | Ohtaka | ................ B60T 8/328 |

FOREIGN PATENT DOCUMENTS

| | | | |
|---|---|---|---|
| JP | 2016190548 | 11/2016 | |
| JP | 2016190548 A | 11/2016 | |
| JP | 2017109699 | 6/2017 | |
| WO | 2009081738 | 7/2009 | |
| WO | 2009081738 A1 | 7/2009 | |
| WO | WO-2009081738 A1 * | 7/2009 | ............. B60T 8/368 |
| WO | 2014077353 | 5/2014 | |
| WO | 2014077353 A1 | 5/2014 | |
| WO | 2016174533 | 11/2016 | |

* cited by examiner

HYDRAULIC PRESSURE CONTROLLER, STRADDLE-TYPE VEHICLE BRAKE SYSTEM, AND STRADDLE-TYPE VEHICLE

BACKGROUND OF THE INVENTION

The invention relates to a hydraulic pressure controller, a straddle-type vehicle brake system including the hydraulic pressure controller, and a straddle-type vehicle including the straddle-type vehicle brake system.

Conventionally, as a brake system that is mounted on a straddle-type vehicle (for example, a pedal-driven vehicle, a two-wheeled motor vehicle, a three-wheeled motor vehicle, an all-terrain vehicle, or the like), a brake system that only includes a single system of a hydraulic circuit capable of controlling a hydraulic pressure has been available. In the hydraulic circuit, a primary channel that communicates between a master cylinder and a wheel cylinder is filled with brake fluid. When an occupant operates a braking operation section such as a lever, a hydraulic pressure of the brake fluid in the primary channel is increased, and a braking force can be generated and applied to a wheel that is provided with the wheel cylinder. In addition, in the hydraulic circuit, the brake fluid in the wheel cylinder can be released to the master cylinder via a secondary channel. That is, the brake system includes a hydraulic pressure controller, and the hydraulic pressure controller controls an operation of a hydraulic pressure regulation valve provided in the primary channel and an operation of a hydraulic pressure regulation valve provided in the secondary channel. In this way, the hydraulic pressure of the brake fluid in the wheel cylinder, that is, the braking force for the wheel is controlled. For example, when lift-off or possible lift-off of a rear wheel is recognized, the hydraulic pressure controller allows a flow of the brake fluid through the secondary channel, so as to lower the hydraulic pressure of the brake fluid in the wheel cylinder (for example, see WO 2016/174533).

SUMMARY OF THE INVENTION

As specifications of the conventional brake system that only includes the single system of the hydraulic circuit capable of controlling the hydraulic pressure, a specification in which the brake fluid in the wheel cylinder is released by driving a pump (that is, by increasing the hydraulic pressure) and a specification in which the brake fluid in the wheel cylinder is released without increasing the hydraulic pressure exist, for example. In the specification in which the brake fluid in the wheel cylinder is released by driving the pump, a motor as a drive source of the pump has to be attached to a base body of the hydraulic pressure controller. In the specification in which the brake fluid in the wheel cylinder is released without increasing the hydraulic pressure, the base body of the hydraulic pressure controller has to be provided with a hydraulic pressure detector that recognizes the lift-off or the possible lift-off of the rear wheel, that is, the hydraulic pressure detector that detects a brake hydraulic pressure of the wheel cylinder. However, in the conventional brake system, shapes, manufacturing processes, and the like of components of the hydraulic pressure controller have to be changed for each of the specifications, and this results in increased part cost (for example, purchase cost, machining cost, maintenance cost, and the like).

The invention has been made with a problem as described above as the background and therefore has a purpose of obtaining a hydraulic pressure controller capable of achieving cost cut, a straddle-type vehicle brake system including such a hydraulic pressure controller, and a straddle-type vehicle including such a straddle-type vehicle brake system.

A hydraulic pressure controller according to the invention is a hydraulic pressure controller for a straddle-type vehicle brake system. A single system of a hydraulic circuit capable of controlling a hydraulic pressure is provided. In the hydraulic circuit, a primary channel communicating between a master cylinder and a wheel cylinder is filled with brake fluid, and the brake fluid in the wheel cylinder is released to the master cylinder via a secondary channel without increasing the hydraulic pressure. The hydraulic pressure controller includes: a base body that is formed with internal channels including a first channel that constitutes at least a portion of the primary channel and a second channel that constitutes at least a portion of the secondary channel; a first coil as a drive source of a first hydraulic pressure regulation valve that opens/closes the first channel; a second coil as a drive source of a second hydraulic pressure regulation valve that opens/closes the second channel; and a hydraulic pressure detector that is provided in the internal channel and detects the hydraulic pressure of the brake fluid in the wheel cylinder. The first coil, the second coil, and the hydraulic pressure detector are erected on the same surface of the base body. An axis of the hydraulic pressure detector is offset from a reference plane that includes an axis of the first coil and an axis of the second coil, and is located between a first plane that is orthogonal to the reference plane and includes the axis of the first coil and a second plane that is orthogonal to the reference plane and includes the axis of the second coil.

A straddle-type vehicle brake system according to the invention includes the above-described hydraulic pressure controller.

A straddle-type vehicle according to the invention includes the above-described straddle-type vehicle brake system.

In the hydraulic pressure controller according to the invention, the first coil, the second coil, and the hydraulic pressure detector are erected on the same surface of the base body. The axis of the hydraulic pressure detector is offset from the reference plane that includes the axis of the first coil and the axis of the second coil, and is located between the first plane that is orthogonal to the reference plane and includes the axis of the first coil and the second plane that is orthogonal to the reference plane and includes the axis of the second coil. In a specification in which the brake fluid in the wheel cylinder is released by driving a pump, it is preferred for a purpose of downsizing to place an axis of a motor at a position that is offset from the reference plane and between the first plane and the second plane. In addition, the hydraulic pressure detector that is required for a specification in which the brake fluid in the wheel cylinder is released without increasing the hydraulic pressure is provided in a similar position to the motor. In this way, shapes of components, a manufacturing process, and the like of the hydraulic pressure controller can be commonalized. Therefore, cost of the hydraulic pressure controller is cut.

DETAILED DESCRIPTION

Figure 1:
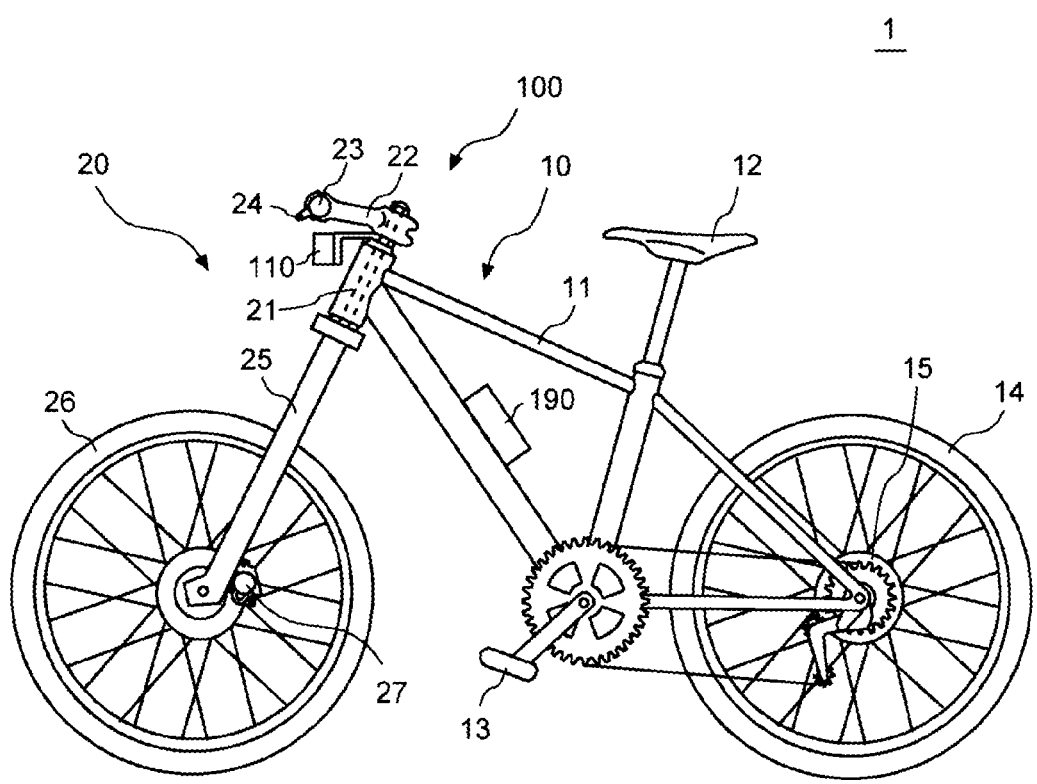
FIG. 1 is a schematic configuration view of a straddle-type vehicle brake system according to a first embodiment of the invention and a pedal-driven vehicle to which the straddle-type vehicle brake system is applied.

A description will hereinafter be made on an embodiment of the invention with appropriate reference to the drawings.

Note that the following description will be made on a case where a straddle-type vehicle brake system according to the invention is mounted on a pedal-driven vehicle (for example, a bicycle, a tricycle, or the like); however, the straddle-type vehicle brake system according to the invention may be mounted on a straddle-type vehicle other than the pedal-driven vehicle (for example, a two-wheeled motor vehicle, a three-wheeled motor vehicle, an all-terrain vehicle, or the like). The pedal-driven vehicle means a vehicle in general that can travel forward on a road by a pressing force that is applied to a pedal. The pedal-driven vehicle includes a normal pedal-driven vehicle, an electric-assisted pedal-driven vehicle, an electric pedal-driven vehicle, and the like. The two-wheeled motor vehicle or the three-wheeled motor vehicle means a so-called motorcycle, and the motorcycle includes a bike, a scooter, an electric scooter, and the like.

A configuration, an operation, and the like, which will be described below, constitute merely one example, and a hydraulic pressure controller according to the invention is not limited to a case with such a configuration, such an operation, and the like. For example, the hydraulic pressure controller according to the invention may execute control other than rear wheel lift-off prevention control.

In the drawings, members or portions that are the same or in a corresponding relationship will be denoted by the same reference sign or will not be denoted by the reference sign. In addition, in each of the drawings, detailed portions will appropriately be simplified or will not be depicted.

First Embodiment

A description will hereinafter be made on a straddle-type vehicle brake system according to a first embodiment.
<Mounting of Straddle-Type Vehicle Brake System on Pedal-Driven Vehicle>

A description will be made on mounting of the straddle-type vehicle brake system according to the first embodiment on the pedal-driven vehicle.

FIG. 1 is a schematic configuration view of the straddle-type vehicle brake system according to the first embodiment of the invention and the pedal-driven vehicle to which the straddle-type vehicle brake system is applied. Note that FIG. 1 depicts a case where a pedal-driven vehicle 1 is the bicycle; however, the pedal-driven vehicle 1 may be another pedal-driven vehicle such as the tricycle.

As depicted in FIG. 1, the pedal-driven vehicle 1 includes: a straddle section 10 that an occupant straddles; and a turning section 20 turnable with respect to the straddle section 10.

The straddle section 10 includes a frame 11, a saddle 12, pedals 13, a rear wheel 14, and a rear wheel braking section 15. The frame 11 pivotally supports the turning section 20. In addition, the frame 11 holds the saddle 12. Furthermore, the frame 11 supports the rear wheel 14 and the rear wheel braking section 15.

The turning section 20 includes a steering column 21, a handlebar stem 22, a handlebar 23, a braking operation section 24, a fork 25, a front wheel 26, and a front wheel braking section 27. The handlebar stem 22 is held by the steering column 21 that is pivotally supported by the straddle section 10. The handlebar 23 is held by the handlebar stem 22. The braking operation section 24 is attached to the handlebar 23. The front wheel 26 and the front wheel braking section 27 are supported by the fork 25 that is coupled to the steering column 21.

The braking operation section 24 includes: a mechanism that is used as an operation section of the rear wheel braking section 15; and a mechanism that is used as an operation section of the front wheel braking section 27. For example, the mechanism that is used as the operation section of the rear wheel braking section 15 is disposed on a left end side of the handlebar 23, and the mechanism that is used as the operation section of the front wheel braking section 27 is disposed on a right end side of the handlebar 23.

A hydraulic pressure controller 110 that controls a hydraulic pressure of brake fluid in the front wheel braking section 27 is coupled to the turning section 20 of the pedal-driven vehicle 1. Meanwhile, the rear wheel braking section 15 is a type of a braking section incapable of controlling a braking force (that is, the type of the braking section that only generates the braking force corresponding to an operation amount by the occupant received by the braking operation section 24 and cannot control the braking force). In other words, the hydraulic pressure controller 110 can only control the braking force that is generated and applied to the front wheel 26 of the pedal-driven vehicle 1. Note that the hydraulic pressure controller 110 may be coupled to a member other than the turning section 20 of the pedal-driven vehicle 1.

A power supply unit 190 as a power supply for the hydraulic pressure controller 110 is attached to the frame 11 of the pedal-driven vehicle 1. The power supply unit 190 may acquire electric power from a battery cell, a generator, or the like, or may acquire the electric power from a battery that stores the electric power produced by the generator or the like. The power supply unit 190 may exclusively be used for the hydraulic pressure controller 110 or may also be used for another device.

More specifically, a straddle-type vehicle brake system 100 that includes the rear wheel braking section 15, the braking operation section 24, the front wheel braking section 27, the hydraulic pressure controller 110, and the power supply unit 190 is mounted on the pedal-driven vehicle 1. The straddle-type vehicle brake system 100 only controls the hydraulic pressure of the brake fluid in the front wheel braking section 27 by using the hydraulic pressure controller 110.

<Configuration of Straddle-Type Vehicle Brake System>

A description will be made on a configuration of the straddle-type vehicle brake system according to the first embodiment.

Figure 2:
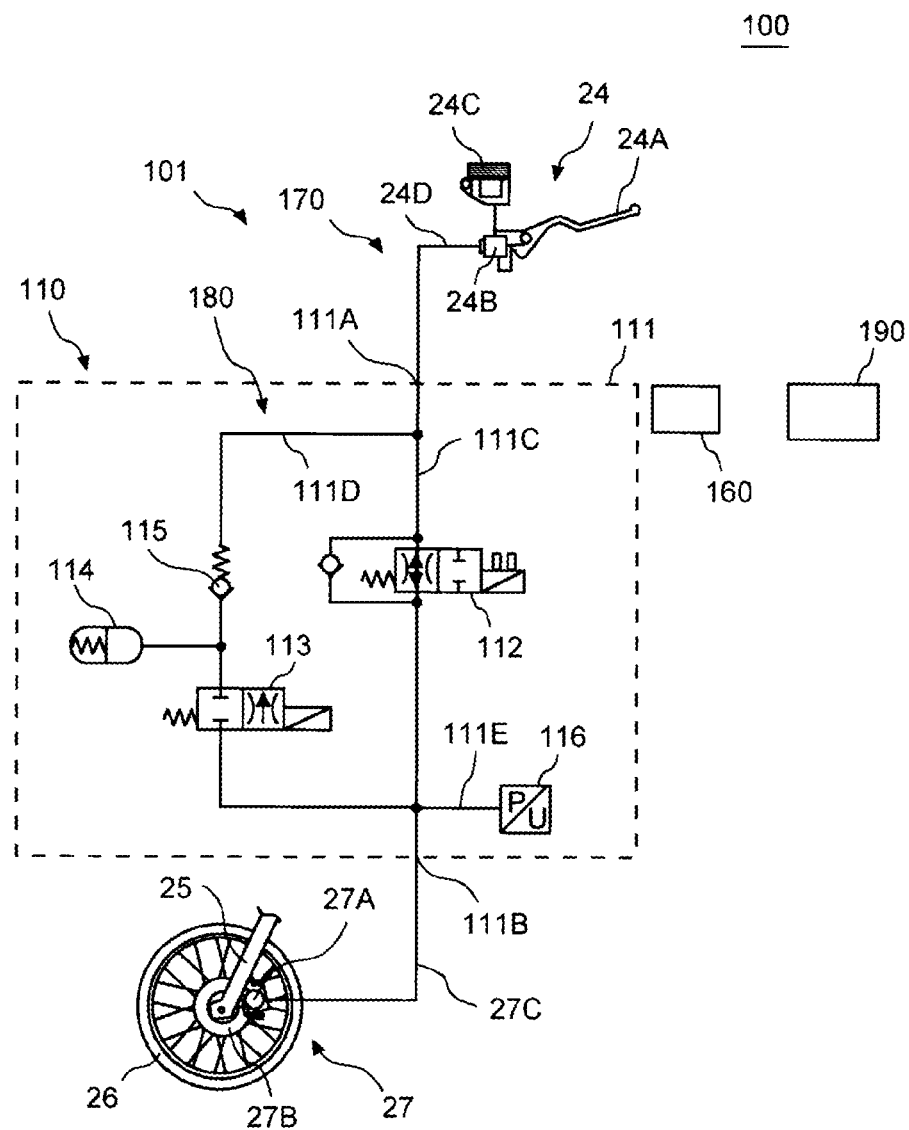
FIG. 2 is a schematic configuration diagram of the straddle-type vehicle brake system according to the first embodiment of the invention.

FIG. 2 is a schematic configuration diagram of the straddle-type vehicle brake system according to the first embodiment of the invention. In FIG. 2, components of the straddle-type vehicle brake system 100 that are related to braking of the rear wheel 14 are not depicted.

As depicted in FIG. 2, the straddle-type vehicle brake system 100 only includes a single system of a hydraulic circuit 101 capable of controlling the hydraulic pressure.

The hydraulic pressure controller 110 includes a base body 111, which will be described below in detail. The base body 111 is formed with a master cylinder port 111A and a wheel cylinder port 111B.

The braking operation section 24 includes a brake lever 24A, a master cylinder 24B, a reservoir 24C, and a fluid pipe 24D. The master cylinder 24B includes a piston (not depicted) that moves in an interlocking manner with an operation of the brake lever 24A by the occupant. The reservoir 24C stores the brake fluid for the master cylinder 24B at the atmospheric pressure. One end of the fluid pipe 24D is connected to the master cylinder 24B, and the other end of the fluid pipe 24D is connected to the master cylinder port 111A.

The front wheel braking section 27 includes a wheel cylinder 27A, a brake disc 27B, and a fluid pipe 27C. The wheel cylinder 27A is held by the fork 25. The wheel cylinder 27A includes a piston (not depicted) that moves in an interlocking manner with a change in the hydraulic pressure of the brake fluid in the fluid pipe 27C connected to the wheel cylinder port 111B. The brake disc 27B is attached to the front wheel 26 and rotates with the front wheel 26. When the piston in the wheel cylinder 27A moves, a brake pad (not depicted) is pressed against the brake disc 27B, and the front wheel 26 is thereby braked.

The base body 111 is formed with a first channel 111C, a second channel 111D, and a third channel 111E as internal channels.

In an example depicted in FIG. 2, the first channel 111C is formed to communicate between the master cylinder port 111A and the wheel cylinder port 111B. In other words, a primary channel 170 is constructed of the fluid pipe 24D, the first channel 111C, and the fluid pipe 27C, and the master cylinder 24B and the wheel cylinder 27A communicate with each other via the primary channel 170. Note that the master cylinder 24B and the master cylinder port 111A may directly be connected without the fluid pipe 24D being interposed therebetween and that the wheel cylinder 27A and the wheel cylinder port 111B may directly be connected without the fluid pipe 27C being interposed therebetween. That is, the first channel 111C is a channel that constitutes at least a portion of the primary channel 170.

In the example depicted in FIG. 2, the second channel 111D is formed to bypass a region of the first channel 111C. In other words, a secondary channel 180 is constructed of the second channel 111D. The secondary channel 180 is a channel through which the brake fluid in the wheel cylinder 27A is released to the master cylinder 24B. Note that the second channel 111D may be connected to the master cylinder 24B without the first channel 111C being interposed therebetween (that is, via a master cylinder port other than the master cylinder port 111A and a fluid channel other than the fluid pipe 24D). In addition, the second channel 111D may be connected to the wheel cylinder 27A without the first channel 111C being interposed therebetween (that is, via a wheel cylinder port other than the wheel cylinder port 111B and a fluid channel other than the fluid pipe 27C). That is, the second channel 111D is a channel that constitutes at least a portion of the secondary channel 180.

The hydraulic pressure controller 110 includes a first hydraulic pressure regulation valve 112, a second hydraulic pressure regulation valve 113, an accumulator 114, a check valve 115, and a hydraulic pressure detector 116. Those components are assembled to the base body 111.

The first hydraulic pressure regulation valve 112 is provided in the region of the first channel 111C that is bypassed by the second channel 111D. The second hydraulic pressure regulation valve 113 is provided in an intermediate portion of the second channel 111D. The first hydraulic pressure regulation valve 112 is an electromagnetic valve that is opened during non-energization, and does not block a flow of the brake fluid during the non-energization. When a first coil 112B, which will be described below, is brought into an energized state in the first hydraulic pressure regulation valve 112, the first hydraulic pressure regulation valve 112 is brought into a closed state and thereby blocks the flow of the brake fluid. The second hydraulic pressure regulation valve 113 is an electromagnetic valve that is closed during the non-energization, and blocks the flow of the brake fluid during the non-energization. When a second coil 113B, which will be described below, is brought into an energized state in the second hydraulic pressure regulation valve 113, the second hydraulic pressure regulation valve 113 is brought into an opened state and thereby allows the flow of the brake fluid. Each of the first hydraulic pressure regulation valve 112 and the second hydraulic pressure regulation valve 113 may not be able to regulate an opening degree thereof in the opened state or may be able to regulate the opening degree thereof in the opened state.

The accumulator 114 is provided on a downstream side of the second hydraulic pressure regulation valve 113 in the second channel 111D. The accumulator 114 stores the brake fluid that has flowed through the second hydraulic pressure regulation valve 113. An elastic element is installed in the accumulator 114, and the elastic element is operated to discharge the brake fluid that has flowed into the accumulator 114. Because the check valve 115 is provided on a downstream side of the accumulator 114, backflow of the discharged brake fluid to the accumulator 114 is prevented. That is, in the hydraulic circuit 101, the brake fluid in the wheel cylinder 27A is released to the master cylinder 24B via the secondary channel 180 without increasing the hydraulic pressure (that is, in a pumpless method).

In the internal channel formed in the base body 111, the hydraulic pressure detector 116 is provided at a position where the hydraulic pressure is substantially the same as the hydraulic pressure of the brake fluid in the wheel cylinder 27A. Note that the example depicted in FIG. 2 depicts a case where the third channel 111E is formed in a portion of the first channel 111C, to which an upstream end of the second channel 111D is connected, and the hydraulic pressure detector 116 is provided in the third channel 111E; however, the hydraulic pressure detector 116 may be connected to another portion of the first channel 111C between the first hydraulic pressure regulation valve 112 and the wheel cylinder port 111B with or without the third channel 111E being interposed therebetween. Alternatively, the hydraulic pressure detector 116 may be connected to a portion of the second channel 111D on an upstream side of the second hydraulic pressure regulation valve 113 with or without the third channel 111E being interposed therebetween.

The hydraulic pressure controller 110 includes a control section 160. The control section 160 may be configured by including a microcomputer, a microprocessor unit, or the like, may be configured by including a member in which firmware and the like can be updated, or may be configured by including a program module or the like that is executed by a command from a CPU or the like, for example.

The control section 160 controls the hydraulic pressure of the brake fluid in the wheel cylinder 27A, that is, the braking force for the front wheel 26 by controlling operations of the first hydraulic pressure regulation valve 112 and the second hydraulic pressure regulation valve 113 in the hydraulic pressure controller 110, that is, the energization of the first coil 112B and the second coil 113B, which will be described below.

For example, in the case where locking or possible locking of the rear wheel 14 is recognized on the basis of output of a front-wheel rotational frequency detector (not depicted) and a rear-wheel rotational frequency detector (not depicted) and overshoot of the hydraulic pressure of the brake fluid in the wheel cylinder 27A is recognized on the basis of output of the hydraulic pressure detector 116 when the braking force is generated and applied to the front wheel 26 through the operation of the brake lever 24A by the occupant, the control section 160 initiates the rear wheel lift-off prevention control.

Once initiating the rear wheel lift-off prevention control, the control section 160 brings the first hydraulic pressure regulation valve 112 into the closed state and blocks the flow of the brake fluid between the master cylinder 24B and the wheel cylinder 27A, so as to prevent an increase in the hydraulic pressure of the brake fluid in the wheel cylinder 27A. Meanwhile, the control section 160 brings the second hydraulic pressure regulation valve 113 into the opened state and allows the flow of the brake fluid from the wheel cylinder 27A to the accumulator 114, so as to lower the hydraulic pressure of the brake fluid in the wheel cylinder 27A. In this way, lift-off of the rear wheel 14 is avoided. When determining that the hydraulic pressure of the brake fluid in the wheel cylinder 27A is lowered to a specified value, the control section 160 brings the second hydraulic pressure regulation valve 113 into the closed state and brings the first hydraulic pressure regulation valve 112 into the opened state for a short period, so as to increase the hydraulic pressure of the brake fluid in the wheel cylinder 27A. The control section 160 may increase/lower the hydraulic pressure of the brake fluid in the wheel cylinder 27A once or may repeatedly increase/lower the hydraulic pressure of the brake fluid in the wheel cylinder 27A for multiple times.

When the rear wheel lift-off prevention control is terminated and the operation of the brake lever 24A is canceled, the inside of the master cylinder 24B is brought into an atmospheric pressure state, and the brake fluid in the wheel cylinder 27A is returned to the master cylinder 24B. Due to generation of this atmospheric pressure state, the brake fluid in the accumulator 114 is also returned to the master cylinder 24B.

<Schematic Configuration of Hydraulic Pressure Controller>

Figure 3:
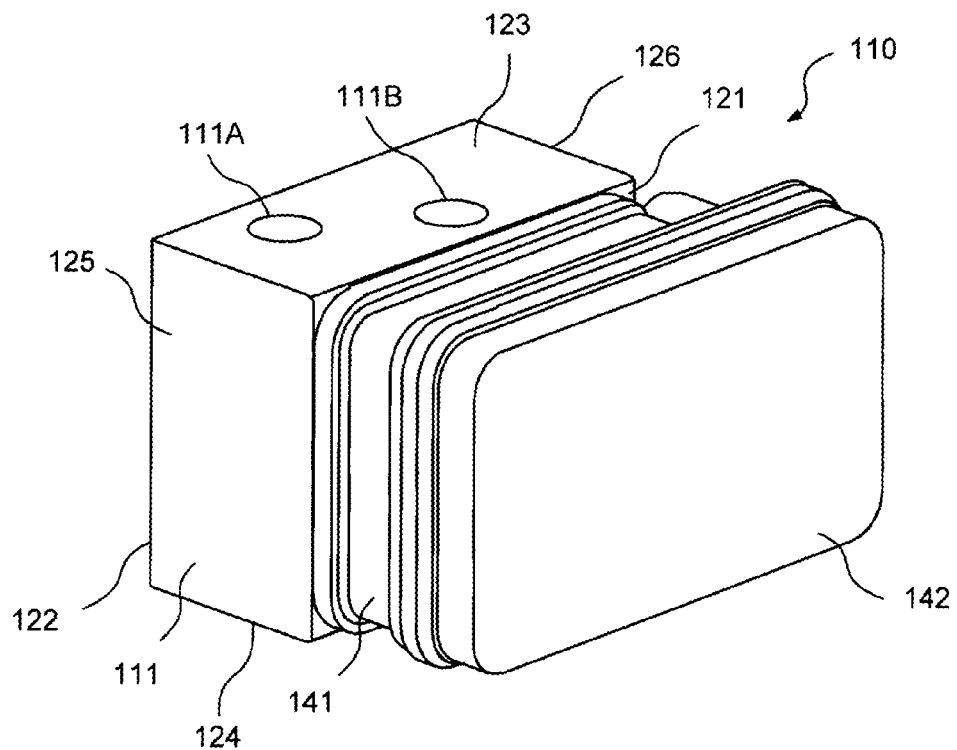
FIG. 3 is a perspective view of a schematic configuration of a hydraulic pressure controller for the straddle-type vehicle brake system according to the first embodiment of the invention.
Figure 4:
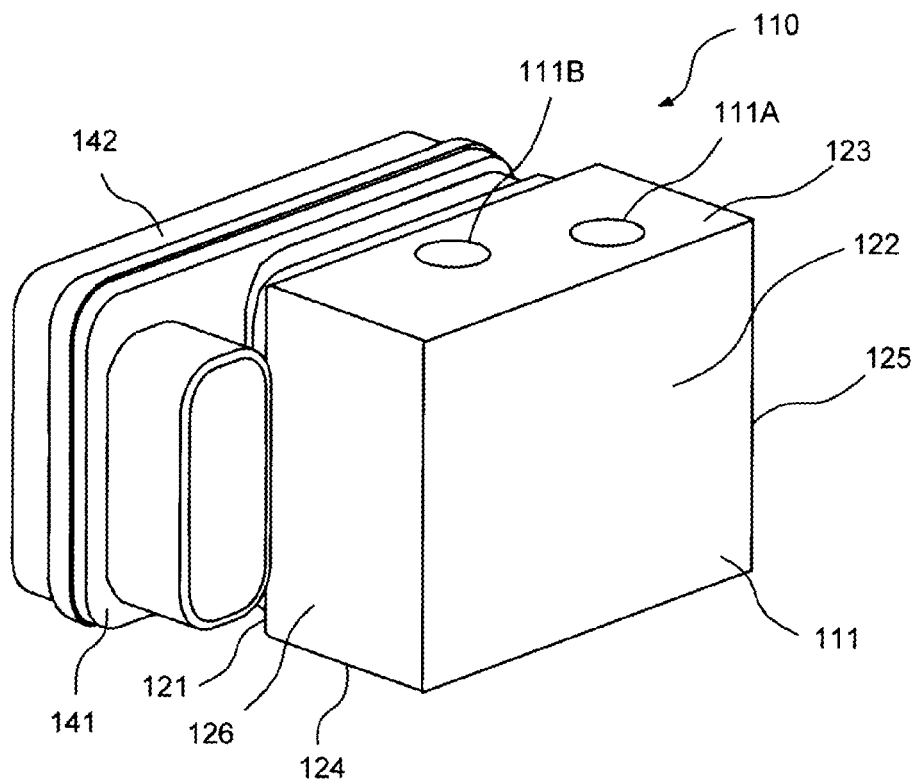
FIG. 4 is a perspective view of the schematic configuration of the hydraulic pressure controller for the straddle-type vehicle brake system according to the first embodiment of the invention.
Figure 5:
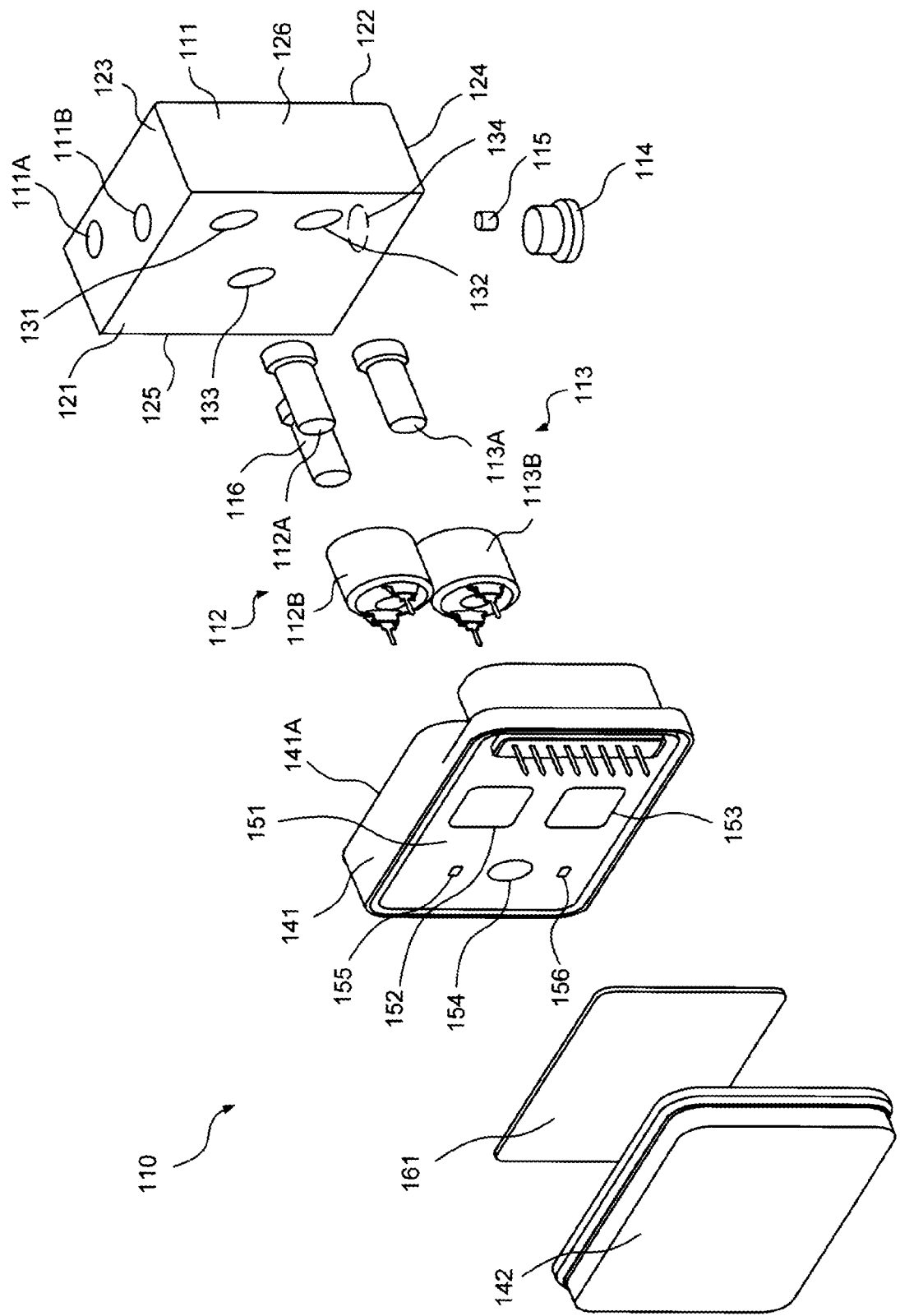
FIG. 5 is an exploded perspective view of the schematic configuration of the hydraulic pressure controller for the straddle-type vehicle brake system according to the first embodiment of the invention.

A description will be made on a schematic configuration of the hydraulic pressure controller for the straddle-type vehicle brake system according to the first embodiment. FIG. 3 and FIG. 4 are perspective views of the schematic configuration of the hydraulic pressure controller for the straddle-type vehicle brake system according to the first embodiment. FIG. 5 is an exploded perspective view of the schematic configuration of the hydraulic pressure controller for the straddle-type vehicle brake system according to the first embodiment of the invention.

As depicted in FIG. 3 to FIG. 5, the hydraulic pressure controller 110 is constructed of: the base body 111 that is formed with the internal channels; the first hydraulic pressure regulation valve 112, the second hydraulic pressure regulation valve 113, the accumulator 114, the check valve 115, and the hydraulic pressure detector 116 that are assembled to the base body 111; a casing 141 that is attached to the base body 111; an electronic substrate 161 that is provided on an opposite side of the casing 141 from the base body 111; a cover 142 that covers the electronic substrate 161; and the like.

The base body 111 is made of aluminum and is a substantially rectangular parallelepiped block, for example. The base body 111 has a first surface 121, a second surface 122, a third surface 123, a fourth surface 124, a fifth surface 125, and a sixth surface 126. The first surface 121 and the second surface 122 are in an opposing positional relationship. The third surface 123 and the fourth surface 124 are in an opposing positional relationship. The fifth surface 125 and the sixth surface 126 are in an opposing positional relationship.

The first surface 121 of the base body 111 is formed with: a first hydraulic pressure regulation valve attachment hole 131 to which the first hydraulic pressure regulation valve 112 is inserted and attached; a second hydraulic pressure regulation valve attachment hole 132 to which the second hydraulic pressure regulation valve 113 is inserted and attached; and a hydraulic pressure detector attachment hole 133 to which the hydraulic pressure detector 116 is inserted and attached. That is, the first hydraulic pressure regulation valve 112, the second hydraulic pressure regulation valve 113, and the hydraulic pressure detector 116 are erected on the same surface (the first surface 121) of the base body 111. Additionally, each of the first surface 121 and the other surfaces is capable of including a stepped portion or a curved portion.

The third surface 123 of the base body 111 is formed with: the master cylinder port 111A to which the fluid pipe 24D is connected; and the wheel cylinder port 111B to which the fluid pipe 27C is connected.

The fourth surface 124 of the base body 111 is formed with an accumulator attachment hole 134 to which the accumulator 114 and the check valve 115 are inserted and attached.

The casing 141 is attached to the first surface 121 of the base body 111. The casing 141 is formed with an accommodation section 141B that is opened in an attachment surface 141A to the base body 111 and will be described below. In a state where the first hydraulic pressure regulation valve 112, the second hydraulic pressure regulation valve 113, and the hydraulic pressure detector 116, which are erected in the base body 111, are accommodated in the accommodation section 141B, the casing 141 is attached to the first surface 121 of the base body 111.

The first hydraulic pressure regulation valve 112 includes: a plunger 112A that opens/closes a valve body by linear reciprocal motion; and the first coil 112B that drives the plunger 112A inserted in a hollow section. The second hydraulic pressure regulation valve 113 includes: a plunger 113A that opens/closes a valve body by linear reciprocal motion; and the second coil 113B that drives the plunger 113A inserted in a hollow section. Coil terminals are provided at a top of each of the first coil 112B and the second coil 113B, which are erected.

A hydraulic pressure detection element is provided on an end surface on a base side of the hydraulic pressure detector 116, and a signal output terminal is provided on an end surface on a top side of the hydraulic pressure detector 116.

Coil terminal through holes 152, 153 and a hydraulic pressure detector through hole 154 are formed at a bottom 151 of the accommodation section 141B in the casing 141. When the casing 141 is attached to the first surface 121 of the base body 111, the coil terminals of the first coil 112B, the coil terminals of the second coil 113B, and the signal output terminal of the hydraulic pressure detector 116 are each brought into a projected state to a back side of the bottom 151 of the accommodation section 141B. The electronic substrate 161 as a component of the control section 160 is connected to those terminals, and the cover 142 is attached to the casing 141 in a manner to accommodate the electronic substrate 161.

At the bottom 151 of the accommodation section 141B in the casing 141, motor terminal through holes 155, 156 are formed on both sides of the hydraulic pressure detector through hole 154. In a specification in which the brake fluid in the wheel cylinder 27A is released by driving a pump, instead of the hydraulic pressure detector 116, a motor as a drive source of the pump is erected at the position of the hydraulic pressure detector 116, and motor terminals (a positive terminal and a negative terminal) provided at a top of the motor are brought into projected states to the back side of the bottom 151 of the accommodation section 141B through the motor terminal through holes 155, 156. That is, the casing 141 is used in a specification in which the brake fluid in the wheel cylinder 27A is released without increasing the hydraulic pressure and the specification in which the brake fluid in the wheel cylinder 27A is released by driving the pump.

<Configuration of Primary Section of Hydraulic Pressure Controller>

A description will be made on a configuration of a primary section of the hydraulic pressure controller for the straddle-type vehicle brake system according to the first embodiment.

Figure 6:
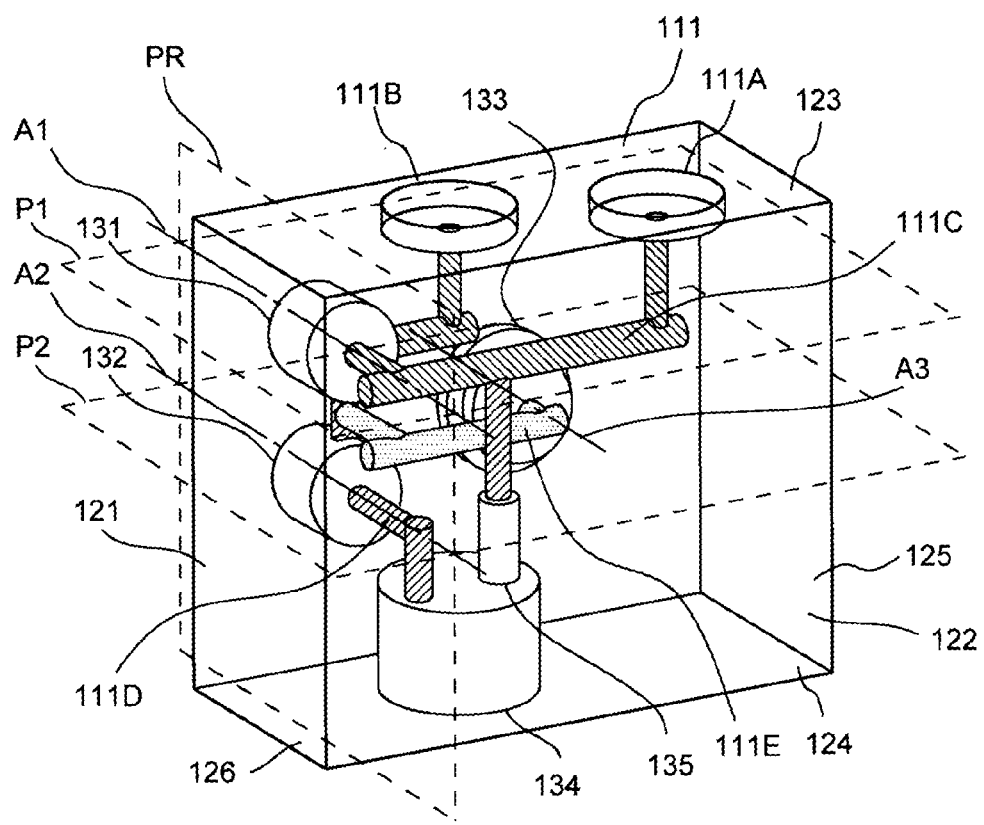
FIG. 6 is an exemplary perspective view of a base body of the hydraulic pressure controller for the straddle-type vehicle brake system according to the first embodiment of the invention.
Figure 7:
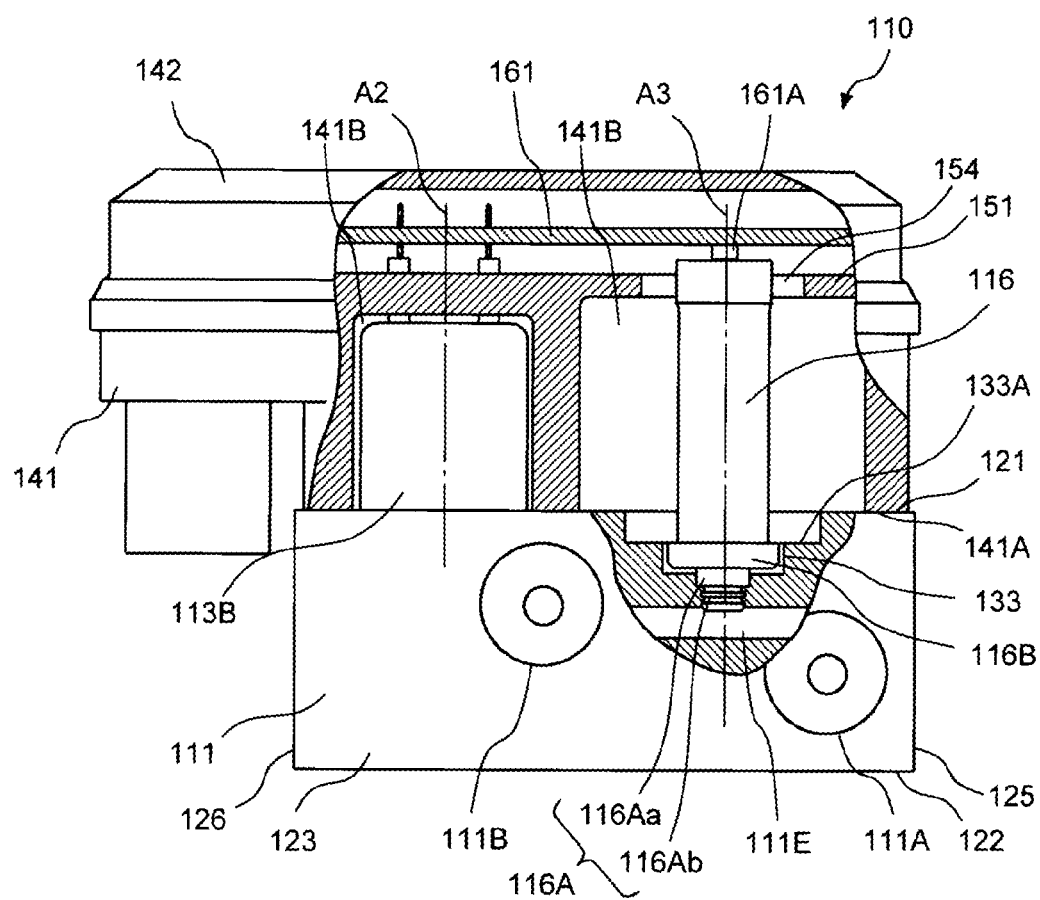
FIG. 7 is a partial cross-sectional view of the hydraulic pressure controller for the straddle-type vehicle brake system according to the first embodiment of the invention.

FIG. 6 is an exemplary perspective view of the base body of the hydraulic pressure controller for the straddle-type vehicle brake system according to the first embodiment of the invention. FIG. 7 is a partial cross-sectional view of the hydraulic pressure controller for the straddle-type vehicle brake system according to the first embodiment of the invention.

As depicted in FIG. 6, on the first surface 121 of the base body 111, the first hydraulic pressure regulation valve attachment hole 131, the second hydraulic pressure regulation valve attachment hole 132, and the hydraulic pressure detector attachment hole 133 are formed axially parallel to each other. An axis A3 of the hydraulic pressure detector attachment hole 133 is offset from a reference plane PR that includes an axis A1 of the first hydraulic pressure regulation valve attachment hole 131 and an axis A2 of the second hydraulic pressure regulation valve attachment hole 132. In addition, the axis A3 of the hydraulic pressure detector attachment hole 133 is located between a first plane P1 that is orthogonal to the reference plane PR and includes the axis A1 and a second plane P2 that is orthogonal to the reference plane PR and includes the axis A2. That is, the axis A3 of the hydraulic pressure detector 116 is offset from the reference plane PR that includes the axis A1 of the first coil 112B and the axis A2 of the second coil 113B, and is located between the first plane P1 that is orthogonal to the reference plane PR and includes the axis A1 of the first coil 112B and the second plane P2 that is orthogonal to the reference plane PR and includes the axis A2 of the second coil 113B.

The third surface 123 of the base body 111 is formed with the master cylinder port 111A and the wheel cylinder port 111B. Of two lateral surfaces of the first surface 121 that are orthogonal to the reference plane PR, the third surface 123 is the lateral surface that is close to the axis A1. In other words, with the first plane P1 being a reference, the master cylinder port 111A and the wheel cylinder port 111B are formed in a region on a side of the base body 111 where the second plane P2 is absent.

The fourth surface 124 of the base body 111 is formed with the accumulator attachment hole 134. Of the two lateral surfaces of the first surface 121 that are orthogonal to the reference plane PR, the fourth surface 124 is the lateral surface that is close to the axis A2. A check valve attachment hole 135 is formed at a bottom of the accumulator attachment hole 134, and the check valve 115 is inserted in and attached to the check valve attachment hole 135.

Note that the example depicted in FIG. 6 depicts a case where the upstream end of the second channel 111D is connected to the first channel 111C at a position inside the first hydraulic pressure regulation valve attachment hole 131 and that the third channel 111E is connected to a portion of the second channel 111D between the second hydraulic pressure regulation valve attachment hole 132 and the first hydraulic pressure regulation valve attachment hole 131; however, the base body 111 may have a different configuration from such a configuration. For example, the upstream end of the second channel 111D may be connected to another portion of the first channel 111C. In addition, the third channel 111E may be connected to the first channel 111C or may be connected to another portion of the second channel 111D. Furthermore, the hydraulic pressure detector attachment hole 133 may directly be connected to the first channel 111C or the second channel 111D without the third channel 111E being interposed therebetween.

As depicted in FIG. 7, a joint section 116A and a flange 116B are formed at an end on the base side of the hydraulic pressure detector 116, that is, the end thereof on a side that is attached to the base body 111. The joint section 116A is inserted in and joined to the hydraulic pressure detector attachment hole 133, and the flange 116B is formed on a side where the electronic substrate 161 is present from the joint section 116A. The joint section 116A includes: a pressing section 116Aa that presses the base body 111; and plural grooves 116Ab. The base body 111, which is deformed by pressing, bites the grooves 116Ab. The flange 116B is used to abut a jig from the top side of the hydraulic pressure detector 116, and the jig is used to press the pressing section 116Aa against the base body 111. A stepped surface 133A is formed around the hydraulic pressure detector attachment hole 133 in the base body 111, and the stepped surface 133A is lower than the region of the first surface 121 where the first coil 112B and the second coil 113B are erected. The hydraulic pressure detector 116 is inserted in the hydraulic pressure detector attachment hole 133 until a tip of the jig abuts the stepped surface 133A. By such assembly, a height position of the top of the hydraulic pressure detector 116 is set.

The end on the top side of the hydraulic pressure detector 116, which is assembled just as described, is brought into the projected state to the back side of the bottom 151 of the accommodation section 141B in the casing 141 through the hydraulic pressure detector through hole 154. The electronic substrate 161 is formed with through holes to which the coil terminals of the first coil 112B and the second coil 113B are inserted and connected. In a state where the coil terminals are connected to the electronic substrate 161, the signal output terminal, which is provided on the end surface on the tip side of the hydraulic pressure detector 116, is brought into an abutment state against a contact piece 161A provided in the electronic substrate 161.

<Effects of Straddle-Type Vehicle Brake System>

A description will be made on effects of the straddle-type vehicle brake system according to the first embodiment.

In the hydraulic pressure controller 110, the first coil 112B, the second coil 113B, and the hydraulic pressure detector 116 are erected on the same surface of the base body 111. The axis A3 of the hydraulic pressure detector 116 is offset from the reference plane PR that includes the axis A1 of the first coil 112B and the axis A2 of the second coil 113B, and is located between the first plane P1 that is orthogonal to the reference plane PR and includes the axis A1 of the first coil 112B and the second plane P2 that is orthogonal to the reference plane PR and includes the axis A2 of the second coil 113B. In the specification in which the brake fluid in the wheel cylinder 27A is released by driving the pump, it is preferred for a purpose of downsizing to place an axis of the motor as the drive source of the pump at a position that is offset from the reference plane PR and between the first plane P1 and the second plane P2. The hydraulic pressure detector 116 that is required for the specification in which the brake fluid in the wheel cylinder 27A is released without increasing the hydraulic pressure is provided at a similar position to the motor. In this way, the components, the manufacturing process, and the like of the hydraulic pressure controller 110 can be commonalized. Thus, cost of the hydraulic pressure controller 110 is cut.

Preferably, in the hydraulic pressure controller 110, the master cylinder port 111A, to which the fluid pipe 24D communicating with the master cylinder 24B is connected, and the wheel cylinder port 111B, to which the fluid pipe 27C communicating with the wheel cylinder 27A is connected, are formed in the region on the side of the base body 111 where the second plane P2 is absent with the first plane P1 being the reference. That is, the master cylinder port 111A is formed not near the second hydraulic pressure regulation valve 113 but near the first hydraulic pressure regulation valve 112. In the specification in which the brake fluid in the wheel cylinder 27A is released by driving the pump, from a perspective of preventing transmission of pump pulsations, it is preferred that a discharge port of the pump is not too close to the master cylinder port 111A. In addition, in the case where the master cylinder port 111A is formed not near the second hydraulic pressure regulation valve 113 but near the first hydraulic pressure regulation valve 112, the first channel 111C is formed between the motor, which is erected instead of the hydraulic pressure detector 116, and the master cylinder port 111A. In this way, the transmission of the pump pulsations can be prevented while enlargement of the base body 111 is avoided. Thus, the cost of the hydraulic pressure controller 110 can be cut while performance of the hydraulic pressure controller 110 is secured.

Preferably, the hydraulic pressure controller 110 includes: the casing 141 that is attached to the base body 111, has the accommodation section 141B opened in the attachment surface 141A to the base body 111, and accommodates the first coil 112B, the second coil 113B, and the hydraulic pressure detector 116 in the accommodation section 141B; and the electronic substrate 161 that is provided on the back side of the bottom 151 of the accommodation section 141B. The hydraulic pressure detector through hole 154 is formed in the region of the bottom 151 that crosses the axis A3 of the hydraulic pressure detector 116, and the top of the hydraulic pressure detector 116 is projected to the back side of the bottom 151 through the hydraulic pressure detector through hole 154. Thus, complicated connection of the hydraulic pressure detector 116 to the electronic substrate 161 is prevented.

In particular, at the bottom 151 of the accommodation section 141B in the casing 141, the motor terminal through holes 155, 156 are preferably formed on both of the sides of the hydraulic pressure detector through hole 154. With such a configuration, the casing 141 can have the same shape for the specification in which the brake fluid in the wheel cylinder 27A is released without increasing the hydraulic pressure and the specification in which the brake fluid in the wheel cylinder 27A is released by driving the pump. Thus, the cost of the hydraulic pressure controller 110 can further be cut.

In particular, the first coil 112B and the second coil 113B are preferably connected to the electronic substrate 161, to which the hydraulic pressure detector 116 is connected, and the joint section 116, which is inserted in and joined to the hydraulic pressure detector attachment hole 133 formed in the base body 111, and the flange 116B, which is formed on the side where the electronic substrate 161 is present from the joint section 116A, are preferably formed at the end of the hydraulic pressure detector 116 on the side attached to the base body 111. With such a configuration, the hydraulic pressure detector 116 can be assembled to the base body 111 while the height position of the top of the hydraulic pressure detector 116 is set with a high degree of accuracy. Thus, the first coil 112B, the second coil 113B, and the hydraulic pressure detector 116 can simultaneously be connected to the electronic substrate 161.

In particular, the stepped surface 133A, which is lower than the region of the base body 111 where the first coil 112B and the second coil 113B are erected, is preferably formed around the hydraulic pressure detector attachment hole 133 of the base body 111. With such a configuration, a distance between the surface of the flange 116B that the jig abuts and the joint section 116A is reduced, and thus the joint section 116A can reliably be joined to the base body 111.

The first embodiment has been described so far. However, the invention is not limited to a mode of the first embodiment. For example, the first embodiment may only partially be implemented.

REFERENCE SIGNS LIST

1: Straddle-type vehicle (pedal-driven vehicle)
10: Straddle section
11: Frame
12: Saddle
13: Pedal
14: Rear wheel
15: Rear-wheel braking section
20: Turning section
21: Steering stem
22: Handlebar stem
23: Handlebar
24: Braking operation section
24A: Brake lever
24B: Master cylinder
24C: Reservoir
24D: Fluid pipe
25: Fork
26: Front wheel 27: Front-wheel braking section
27A: Wheel cylinder
27B: Brake disc
27C: Fluid pipe
100: Straddle-type vehicle brake system
101: Hydraulic circuit
110: Hydraulic pressure controller
111: Base body
111A: Master cylinder port
111B: Wheel cylinder port
111C: First channel
111D: Second channel
111E: Third channel
112: First hydraulic pressure regulation valve
112A: Plunger
112B: First coil
113: Second hydraulic pressure regulation valve
113A: Plunger
113B: Second coil
114: Accumulator
115: Check valve
116: Hydraulic pressure detector
116A: Joint section
116Aa: Pressing section
116Ab: Groove
116B: Flange
121: First surface
122: Second surface
123: Third surface
124: Fourth surface
125: Fifth surface
126: Sixth surface
131: First hydraulic pressure regulation valve attachment hole
132: Second hydraulic pressure regulation valve attachment hole
133: Hydraulic pressure detector attachment hole
133A: Stepped surface
134: Accumulator attachment hole
135: Check valve attachment hole
141: Casing
141A: Attachment surface
141B: Accommodation section
142: Cover
151: Bottom
152, 153: Coil terminal through hole
154: Hydraulic pressure detector through hole
155, 156: Motor terminal through hole
160: Control section
161: Electronic substrate
161A: Contact piece
170: Primary channel
180: Secondary channel
190: Power supply unit
PR: Reference plane
P1: First plane
P2: Second plane
A1, A2, A3: Axis

The invention claimed is:

1. A hydraulic pressure controller (110) for a straddle-type vehicle brake system (100) with a hydraulic circuit (101),
wherein the hydraulic circuit (101) is configured to control a hydraulic pressure within the hydraulic circuit (101),
wherein the hydraulic circuit (101) comprises a primary channel (170) that is in fluid communication with a master cylinder (24B) and a wheel cylinder (27A) of the straddle-type vehicle brake system (100),
wherein the primary channel (170) is filled with brake fluid,
wherein the hydraulic pressure controller (110) is configured to release the brake fluid from the wheel cylinder (27A) to the master cylinder (24B) via a secondary channel (180),
wherein the hydraulic pressure controller (110) is configured to release the brake fluid from the wheel cylinder (27A) without increasing the hydraulic pressure, and
wherein the hydraulic pressure controller (110) comprises:
a base body (111) that is formed with internal channels including: a first channel (111C) that constitutes at least a portion of the primary channel (170); and a second channel (111D) that constitutes at least a portion of the secondary channel (180);
a first coil (112B) as a drive source of a first hydraulic pressure regulation valve (112) that opens/closes the first channel (111C);
a second coil (113B) as a drive source of a second hydraulic pressure regulation valve (113) that opens/closes the second channel (111D); and
a hydraulic pressure detector (116) that is provided in the internal channel and detects the hydraulic pressure of the brake fluid in the wheel cylinder (27A) of the straddle-type vehicle brake system (100),
wherein the first coil (112B), the second coil (113B), and the hydraulic pressure detector (116) are erected on a same surface (121) of the base body (111),
wherein an axis (A3) of the hydraulic pressure detector (116) is offset from a reference plane (PR) that includes an axis (A1) of the first coil (112B) and an axis (A2) of the second coil (113B), and is located between a first plane (P1) and a second plane (P2), the first plane (P1) being orthogonal to said reference plane (PR) and including said axis (A1) of the first coil (112B), and the second plane (P2) being orthogonal to said reference plane (PR) and including said axis (A2) of the second coil (113B),
wherein the hydraulic pressure controller (110) further comprises:
a casing (141) that is attached to the base body (111) and that has an accommodation section (141B) opened in an attachment surface (141A), the attachment surface (141A) contacting the base body (111) and the accommodation section (141B) accommodating the first coil (112B), the second coil (113B), and the hydraulic pressure detector (116) in said accommodation section (141B),
wherein a wall integral with the casing (141) forms part of the attachment surface (141A), and
wherein the wall extends between the hydraulic pressure detector (116) and at least one of the first coil (112B) and the second coil (113B); and
an electronic substrate (161) that is provided on a back side of a bottom (151) of the accommodation section (141B), and
wherein a hydraulic pressure detector through hole (154) is formed in a region of the bottom (151) that crosses the axis (A3) of the hydraulic pressure detector (116), and a top of the hydraulic pressure detector (116) is projected to the back side of the bottom (151) through said hydraulic pressure detector through hole (154).

2. The hydraulic pressure controller (110) according to claim 1, wherein a master cylinder port (111A) and a wheel cylinder port (111B) are formed in a region of the base body (111) on a side where the second plane (P2) is absent with the first plane (P1) being a reference, wherein a first fluid pipe (24D) of the straddle-type vehicle brake system (100) that is configured to communicate with the master cylinder (24B) is connected to the master cylinder port (111A), and wherein a second fluid pipe (27C) of the straddle-type vehicle brake system (100) that is configured to communicate with the wheel cylinder (27A) of the straddle-type vehicle brake system (100) is connected to the wheel cylinder port (111B).

3. The hydraulic pressure controller (110) according to claim 1, wherein the hydraulic pressure controller (110) comprises a motor as a drive source of a pump attached to the base body at the bottom (151) of the casing (141), and wherein motor terminal through holes (155, 156) are formed on both sides of the hydraulic pressure detector through hole (154).

4. The hydraulic pressure controller (110) according to claim 1, wherein the first coil (112B) and the second coil (113B) are connected to the electronic substrate (161) to which the hydraulic pressure detector (116) is connected, and wherein a joint section (116A) and a flange (116B) are formed at an end of the hydraulic pressure detector (116) on a side that is attached to the base body (111), the joint section (116A) being inserted in and joined to a hydraulic pressure detector attachment hole (133) formed in the base body (111), and the flange (116B) being formed on a side where the electronic substrate (161) is present from said joint section (116A).

5. The hydraulic pressure controller (110) according to claim 4, wherein a stepped surface (133A) is formed around the hydraulic pressure detector attachment hole (133) in the base body (111), the stepped surface (133A) being lower than a region of the base body (111) where the first coil (112B) and the second coil (113B) are erected.

6. The hydraulic pressure controller (110) according to claim 1, wherein the wall extends from the bottom 151 of the accommodation section 141B.

7. A straddle-type vehicle brake system (100) comprising: the hydraulic pressure controller (110) according to claim 1.

8. A straddle-type vehicle comprising:

the straddle-type vehicle brake system (100) according to claim 7.

* * * * *